(12) United States Patent
Jenne

(10) Patent No.: US 9,098,277 B2
(45) Date of Patent: Aug. 4, 2015

(54) INFORMATION HANDLING SYSTEM CONFIGURATION FOR POWER SYSTEM OUTPUT CAPABILITY

(75) Inventor: John E. Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 414 days.

(21) Appl. No.: 13/598,966

(22) Filed: Aug. 30, 2012

(65) Prior Publication Data

US 2014/0068282 A1    Mar. 6, 2014

(51) Int. Cl.
*G06F 1/26* (2006.01)
*G06F 1/32* (2006.01)

(52) U.S. Cl.
CPC ............. *G06F 1/3206* (2013.01); *G06F 1/266* (2013.01)

(58) Field of Classification Search
CPC ............................... G06F 1/3206; G06F 1/266
USPC ................................................. 713/300, 340
See application file for complete search history.

(56) References Cited

U.S. PATENT DOCUMENTS

| 7,487,371 B2 * | 2/2009 | Simeral et al. ................ 713/300 |
| 8,402,296 B2 * | 3/2013 | Brundridge et al. .......... 713/340 |
| 2008/0109811 A1 * | 5/2008 | Krauthgamer et al. ....... 718/104 |
| 2010/0058091 A1 * | 3/2010 | Lambert et al. ............... 713/330 |

* cited by examiner

*Primary Examiner* — Thuan Du
(74) *Attorney, Agent, or Firm* — Haynes and Boone, LLP

(57) ABSTRACT

An IHS configuration system includes a plurality of IHS components including a processor system having a first maximum load current. A power system controller is coupled to the plurality of IHS components and operable to couple to a power supply. The power system controller is operable to retrieve a power output limit of the power system and determine a first system power budget for the plurality of IHS components using the first maximum load current of the processor system. The power system controller then determines whether the first system power budget exceeds the power output limit and, in response to the first system power budget exceeding the power output limit, the power system controller provides a second maximum load current for the processor system to create a second system power budget that does not exceed the power output limit.

20 Claims, 5 Drawing Sheets

INFORMATION HANDLING SYSTEM CONFIGURATION FOR POWER SYSTEM OUTPUT CAPABILITY

BACKGROUND

The present disclosure relates generally to information handling systems, and more particularly to the configuration of an information handling system for a power system output capability.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As IHS performance continues to increase, processor manufacturers are pushing processors to higher power limits. For example, Intel® provides processor features such as "Turbo Boost" that allow the processor to operate at higher than the rated frequency (a.k.a, "over clock") as long as power and thermal envelopes are maintained. In some cases, power envelopes have been redefined to allow for excursions above the traditional Thermal Design Power (TDP) of the processor. For example, Intel® has defined a dynamic power ($P_{dyn}$) that allows the processor to draw power that is up to 120% of TDP for a period of seconds. In processors with multiple cores, processors that transition between low and high power instructions, and processors implementing other processor features known in the art, excursions above $P_{dyn}$ may occur up to maximum power ($P_{max}$).

The magnitude and the duration of power excursions by processors above $P_{dyn}$ are becoming significant enough to reach the Power Supply Unit (PSU), as $P_{max}$ for processors is expected to approach, and possibly exceed, twice the TDP of the processor, with power excursions up to $P_{max}$ having durations of milliseconds. Conventionally, the power system provided for IHSs including such processors must then be budgeted for $P_{max}$ in order to ensure that the PSU load does not exceed the PSU capacity, as exceeding PSU capacity can result in PSU shutdown and the accompanying possibility of IHS data loss. The need to budget for $P_{max}$ to accommodate these power excursions results in larger and costlier PSUs, which are sometimes not an option in dense IHS designs or IHSs that require redundant PSUs.

Accordingly, it would be desirable to provide an improved IHS.

SUMMARY

According to one embodiment, an IHS configuration system includes a plurality of IHS components including a processor system having a first maximum load current; and a power system controller coupled to the plurality of IHS components and operable to couple to a power supply, wherein the power system controller is operable to: retrieve a power output limit of the power system; determine a first system power budget for the plurality of IHS components using the first maximum load current of the processor system; and determine that the first system power budget exceeds the power output limit and, in response, provide a second maximum load current for the processor system to create a second system power budget that does not exceed the power output limit.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
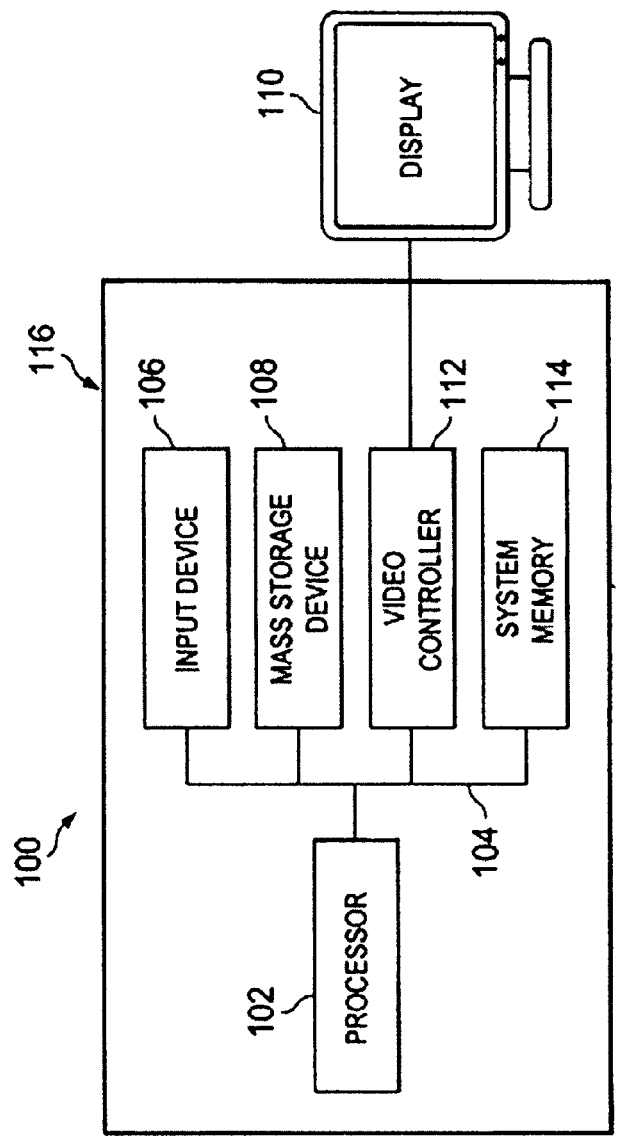
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
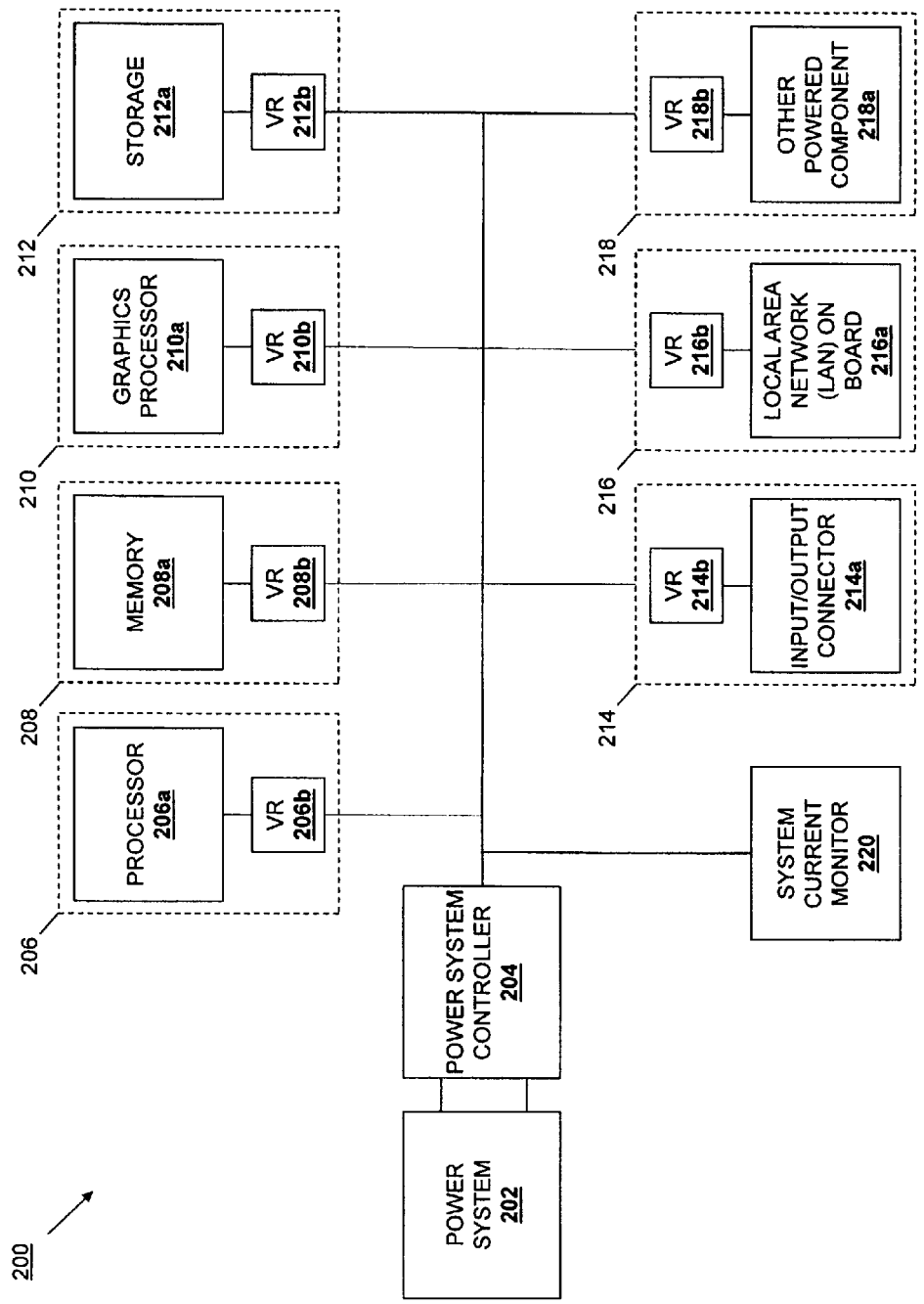
FIG. 2 is a schematic view illustrating an embodiment of a power output limit-based configuration system.

Referring now to FIG. 2, an embodiment of a power output limit-based configuration system 200 is illustrated. As discussed in further detail below, the power output limit-based configuration system 200 may be implemented in or with a variety of IHS's known in the art. For example, the power output limit-based configuration system 200 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the power output limit-based configuration system 200 may be implemented as a modular IHS such as, for example, a blade server. As such, in some embodiments, all of the elements in the power output limit-based configuration system 200 may be housed in an IHS chassis (e.g., the chassis 116 discussed above with reference to FIG. 1), while in other embodiments, elements of the power output limit-based configuration system 200 may be coupled to the IHS (e.g., a plurality of modular IHSs may be coupled to the power system that may include any combination of power supply units (PSUs), power distribution units (PDUs), and/or any a variety of other power system components known in the art, discussed in further detail below.) Thus, a wide variety of modification to the specific embodiments discussed below is envisioned as falling within the scope of the present disclosure, including but not limited to distribution of the components across one or more IHSs.

The power output limit-based configuration system 200 includes a power system 202, which may include one or more PSUs, PDUs, and/or a variety of other power system components known in the art. The power system 202 may be housed in an IHS chassis with the some or all of the components of the power output limit-based configuration system 200, coupled to an IHS chassis that houses some or all of the components of the power output limit-based configuration system 200, and/or partially housed in and partially coupled to an IHS chassis that houses some or all of the components of the power output limit-based configuration system 200. The power system 202 includes a power system output capability that may include one or more power output limits. For example, the power system 202 may include one more PSUs that includes a PSU output capability having a plurality of PSU output limits such that the PSU is operable in a normal operating range, an undefined range, and a shut-down range, discussed in further detail with reference to FIG. 4. In one embodiment, the power system 202 is operable to receive Alternating Current (AC) power and convert it to Direct Current (DC) power with a voltage of approximately 12.2 volts. However, a variety of different power systems operating in a variety of different manners are envisioned as falling within the scope of the present disclosure.

The power supply 202 is coupled to a power system controller 204. In an embodiment, the power system controller 204 may include a Basic Input Output System (BIOS), a Unified Extensible Firmware Interface (UEFI) system, a Operating System, a hypervisor, a Baseboard Management Controller such as a Remote Access Controller, and/or a variety of other power system controllers known in the art. The power system controller 204 is coupled to a plurality of powered component systems that, in the illustrated embodiment, include a processor system 206 that includes at least one processor 206a and processor voltage regulator 206b, a memory system 208 that includes at least one memory device 208a and memory device voltage regulator 208b, a graphics processor system 210 that includes a graphics processor 210a and graphics processor voltage regulator 210b, a storage system 212 that includes a storage device 212a and storage device voltage regulator 212b, an Input/Output (I/O) system 214 that includes an I/O connector 214a and an I/O device voltage regulator 214b, a Local Area Network (LAN) on board (LOB) system 216 that includes a LOB 216a and a LOB voltage regulator 216b, and/or one or more other powered component systems 218 that include one or more other powered components 218a and one or more other powered component voltage regulators 218b. While each of the powered component systems in the illustrated embodiment includes a voltage regulator for its powered component, one of skill in the art will recognize that some powered components may include dedicated voltage regulators while other powered components may share a voltage regulator provided for the components and/or included in the power system 202. In some embodiments, a system current monitor 220 is coupled to the power system controller 204 and is operable to determine the power demands for some or all of the powered components systems.

In an embodiment, any of the powered component systems in the power output limit-based configuration system 200 may include a powered component configuration that dictates, regulates, and/or otherwise controls how that powered component system consumes power. In the embodiment discussed below, the powered component configuration is discussed with regard to the processor system 206. However, one of skill in the art will recognize that powered component configurations similar to those discussed below for the processor system 206 may be provided for the memory system 208, the graphics processor system 210, the storage system 212, the Input/Output (I/O) system 214, the LOB system 216, and/or any or all of the one or more other powered component systems 218. Furthermore, the powered component configuration discussed below focuses on a maximum load current (e.g., "ICCMAX") for the processor system 206, but one of skill in the art will recognize that a variety of other powered component configuration details may be used while remaining within the scope of the present disclosure.

In the embodiment discussed below, the maximum load current for the processor system 206 may be stored in a configuration register in the processor system 206 (e.g., in the processor voltage regulator 206b) and may be programmable or configurable by the power system controller 204 to limit the peak current drawn by the processor 206a based on the value of the maximum load current read from the voltage regulator 206b (e.g., via a System V Interface Definition (SVID) interface). Traditionally, the configuration register has been used to limit the maximum load current for a processor in order to allow higher power processors to be installed in systems that were not designed for such high power processors (e.g., when plugged into a system designed for 95 watt processors, a 135 watt processor would operate as a 95 watt processor by referencing the configuration register and limiting the processor peak current due to the processor voltage regulator output current limitations such that processor operated similarly to a 95 watt processor). The power output limit-based configuration system 200 of the present disclosure is operable to use the power system output capability of the power system 202 and the power demands of the system to intelligently determine a value for the maximum load current, which allows the system to be configured within the limits of the power system, while limiting the effects of the configuration on the performance of the processor, as discussed in further detail below.

Figure 3:
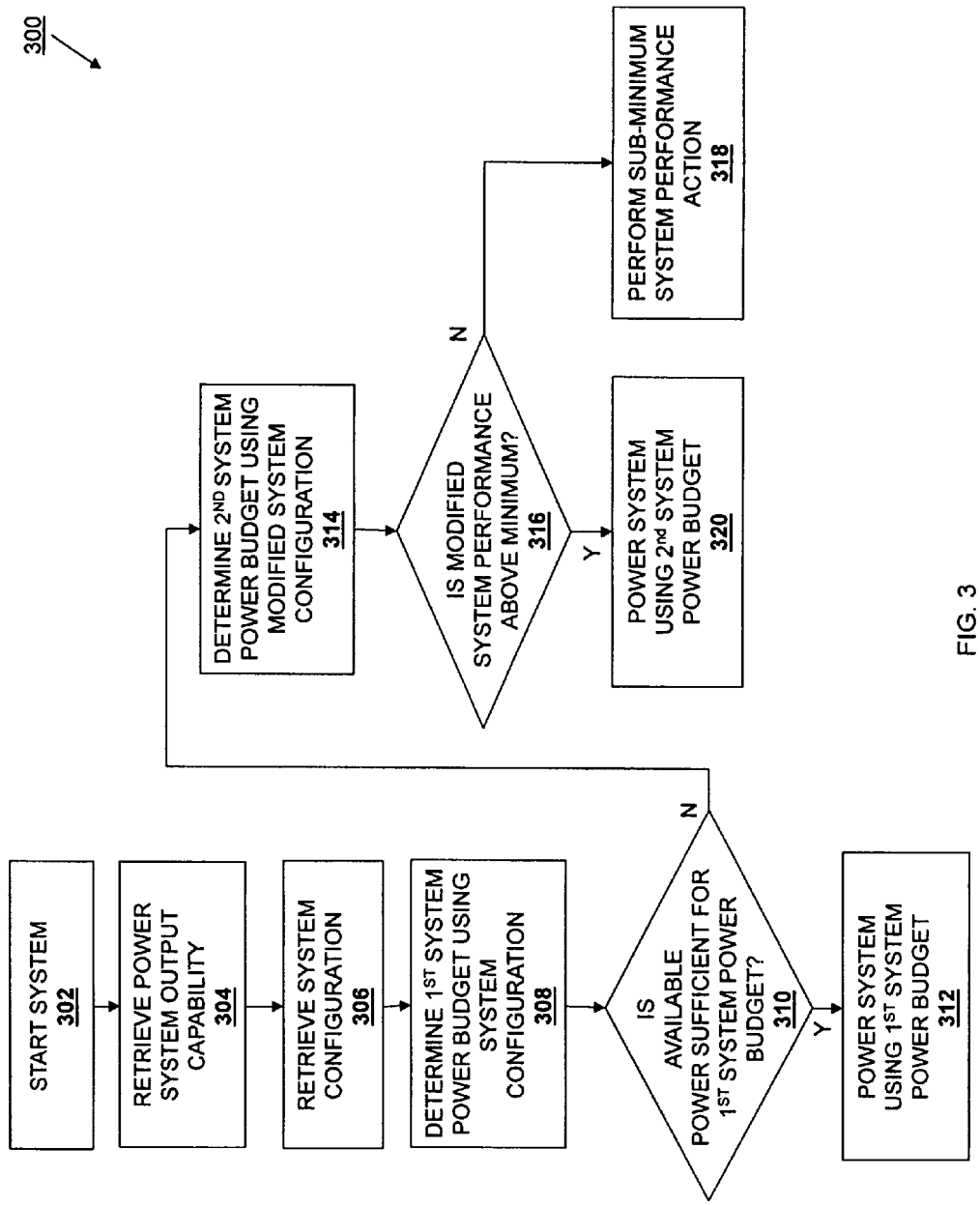
FIG. 3 is a flow chart illustrating an embodiment of a method for configuring an IHS for a power system output capability.

Referring now to FIG. 3, a method 300 for configuring an IHS for a power system output capability is illustrated. In the embodiment discussed below, the method 300 performs a static configuration upon system startup that creates but minimizes the associated processor performance degradation in order to limit peak power spikes that go beyond the output capabilities of the power system in order to prevent negative power system operations such as shut down. Thus, in the embodiment discussed below, the method 300 provide a preventative method executed at system start up that ensures that the system will operate within the limits of the power system, which may be necessary in most systems today because powered component systems tend to spike to peak power so quickly that conventional measurement devices and techniques simply are not fast enough to detect those peaks in time to adjust operation of the system to remain within the output limits of the power system. However, the present disclosure envisions future powered component systems that will be operable to detect peaks in powered component power demand quickly enough to allow real-time system adjustment, and thus the teachings of the present disclosure may be incorporated in a dynamic configuration system.

Figure 4:
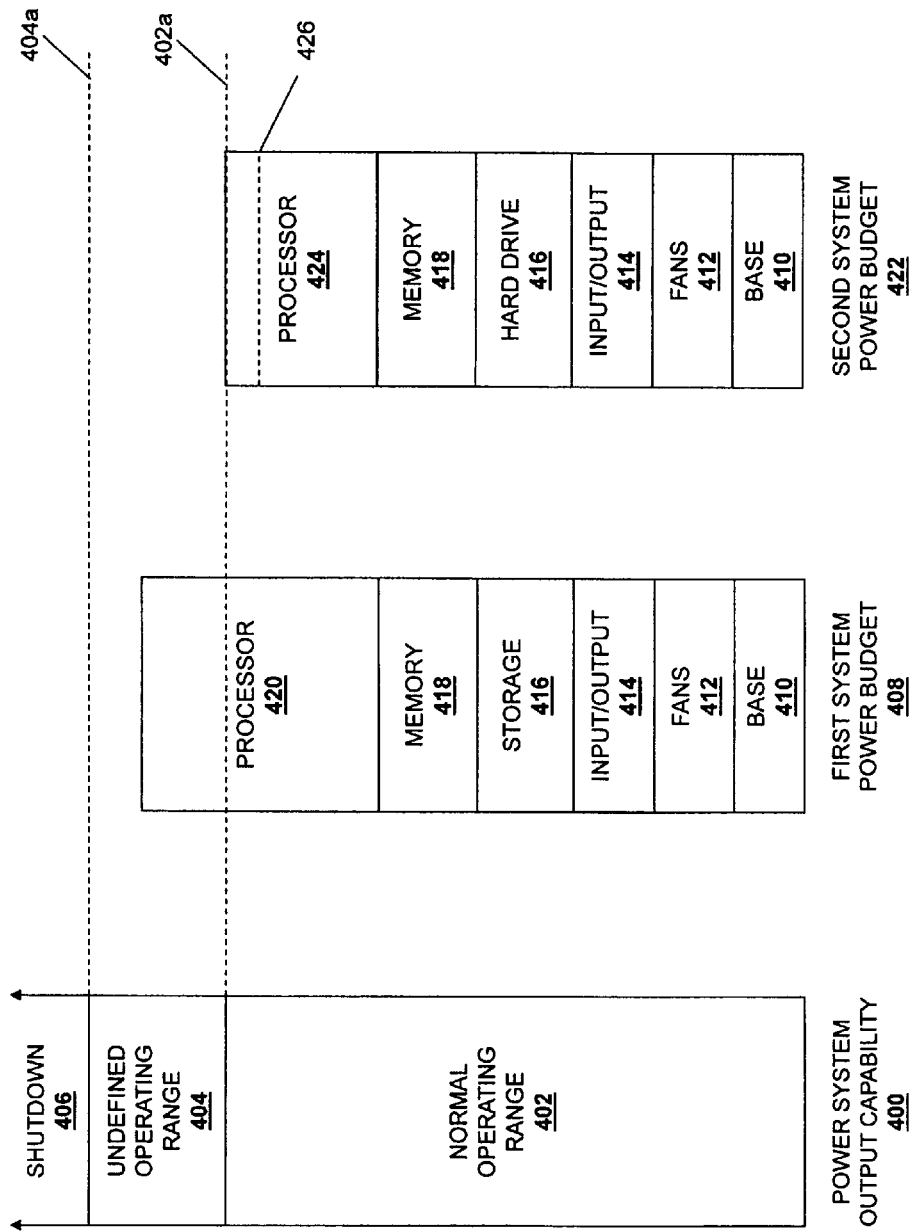
FIG. 4 is a graphical view illustrating an embodiment of a power system output capability, a first system power budget, and a second system power budget.

The method 300 begin at block 302 where the system is started. System startup may include the powering-on of an IHS (e.g., the IHS 100 discussed above with reference to FIG. 1). In response to the system starting up at block 302, the method 300 proceeds to block 304 where a power system output capability is retrieved. As discussed above, the power system 202 includes a power system output capability that may include one or more power output limits. At block 304, the power system controller 204 may retrieve (e.g., over the Power Management Bus (PMBus)) one or more power output limits of the power system 202. FIG. 4 illustrates an embodiment of a power system output capability 400 of a power system, which may be the power system 202 of FIG. 2, that includes a normal operating range 402 with a first power output limit 402a at the top of the normal operating range 402, an undefined operating range 404 with a second power output limit 404a at the top of the undefined operating range 404, and a shutdown level 406 over the second power output limit 404a. For example, the normal operating range 402 in the power system output capability 400 may be the range within which the power system is designed to operate normally, supporting the supply of power to all the powered component systems. The undefined operating range 404 in the power system output capability 400 may be a range within which the power system may operate normally, may operate in at a reduced level, or may cease operation. The shutdown level 406 in the power system output capability 400 may be the level at which the power system shuts down automatically to protect the power system and the IHS to which it is supplying power, and is accompanied by the possibility of IHS data loss. A variety of intermediate operating ranges may exist between the normal operating range 402 and the undefined operating range 404, but have been omitted for clarity of discussion. In one example of block 304, the power system controller 204 may determine the first power output limit 402a that includes the power at which the power system switches from the normal operating range 402 to the undefined operating range 404. However, other power output limits and/or other power system output capabilities may be used in place of or in addition to the power output limit indicating a transition from normal to undefined operation.

The method 300 then proceeds to block 306 where a system configuration is retrieved. In an embodiment, the power system controller 204 is operable to retrieve data associated with, related to, and/or otherwise indicative of the power demands from the powered component systems. In some embodiments, the data indicative of the power demand from the system may be retrieved using a subset of the powered components systems. For example, the power system controller 204 may retrieve a quantity and type of processors in the system, a quantity and types of memory devices in the systems, and/or a variety of other powered component system data known in the art. In other embodiments, the data indicative of the power demand from the system may be retrieved from all of the powered component systems. In an embodiment, at block 306 of the method 300, the power system controller 204 retrieves a first maximum load current for the processor 206a as at least part of the system configuration. For example, the first maximum load current may be the value of the maximum load current in the processor voltage regulator 206b upon startup of the system at block 302.

The method 300 then proceeds to block 308 where a first system power budget is determined using the system configuration. In an embodiment, the power system controller 204 uses the data retrieved about the system configuration at block 306 of the method 300 to determine a first power system budget 408 that includes a power demand 410 for a system base (e.g., the maximum power demanded by circuit boards and/or other similar components in the system), a power demand 412 for one or more fans (e.g., the maximum power demanded by fans in the system), a power demand 414 for one or more I/O devices (e.g., the maximum power demanded by I/O devices coupled to the I/O connector 214a), a power demand 416 for one or more storage devices (e.g., the maximum power demanded by storage devices in the system), a power demand 418 for one or more memory devices (e.g., the maximum power demanded by memory devices coupled to the system), and a power demand 420 for one or more processors (e.g., the maximum power demanded by processors in the system). For example, the power system controller 204 may use a maximum load current retrieved from the processor system 206 in block 306 of the method 300 to determine that the processor system 206 includes the power demand 420.

The method 300 then proceeds to decision block 310 where it is determined whether there is available power that is sufficient for the first system power budget. The power system controller 204 is operable to use the power system output capability of the power system (e.g., the power system output capability 400) retrieved in block 304 of the method 300 and the first power system budget (e.g., the first power system budget 408) determined in block 308 to determine whether there is available power sufficient for the first system power budget. As discussed above, the power system output capability 400 illustrated in FIG. 4 includes a first power output limit 402a above which the power system enters an undefined operating range 404. If the first power system budget 408 is below that first power output limit 402a (not illustrated in FIG. 4), the method 300 proceeds to block 312 where the system is powered using the first system power budget. Thus, in an embodiment, upon determining that the system configuration will result in power demands that will not exceed the output capability of the power system 202, the power system controller 204 provides power from the power system 202 to the powered component systems 206, 208, 210, 212, 214, 216 and/or 218 according to the system configuration power requirements.

However, as illustrated in FIG. 4, the first system power budget 408 may extend above the first power output limit 402*a* (e.g., as illustrated with the power demand 420 for one or more processors extending into the undefined operating range 404 when the power demands 410, 412, 414, 416, and 418 are met.) In such a situation, at decision block 310, the power system controller 204 will determine that the available power is insufficient for the first system power budget, and the method 300 will proceed to block 314 where a second system power budget is determined using a modified system configuration. For example, the power system controller 204 may be operable to recalculate the maximum load current of the processor system 206 to reduce the power demand for the processor system 206 such that a second system power budget is determined that does not extend above the first power output limit 402*a*. In the illustrated embodiment, the power system controller 204 has recalculated the maximum load current of the processor system 206 to determine a second system power budget 422 that includes a power demand 424 for the processor system 206 that is reduced relative to the power demand 420 for the processor system 206 in the first system power budget 408. As can be seen, the second system power budget 422 does not extend past the first power output limit 402*a*, and thus will not result in the power system 202 entering the undefined operating range 404. Conventionally, an IHS including the first system power budget 408 would simply not be able to use the power system with the power system output capability 400, and a larger, costlier, and less efficient power supply would be required. The systems and methods of the present disclosure allow the IHS to be reconfigured to use the second system power budget 422 such that the power system with the power system output capability 400 can be used without the possibility of the power system entering an undefined operating range. While the discussion herein references a processor ICCMAX register, that embodiment is but one to limit the peak power of the processor statically, and additional techniques exists or may exist in the future that may be used similarly, including but not limited to statically limiting the maximum performance state of the processor, disabling "turbo" operation of the processor, etc.

Figure 5:
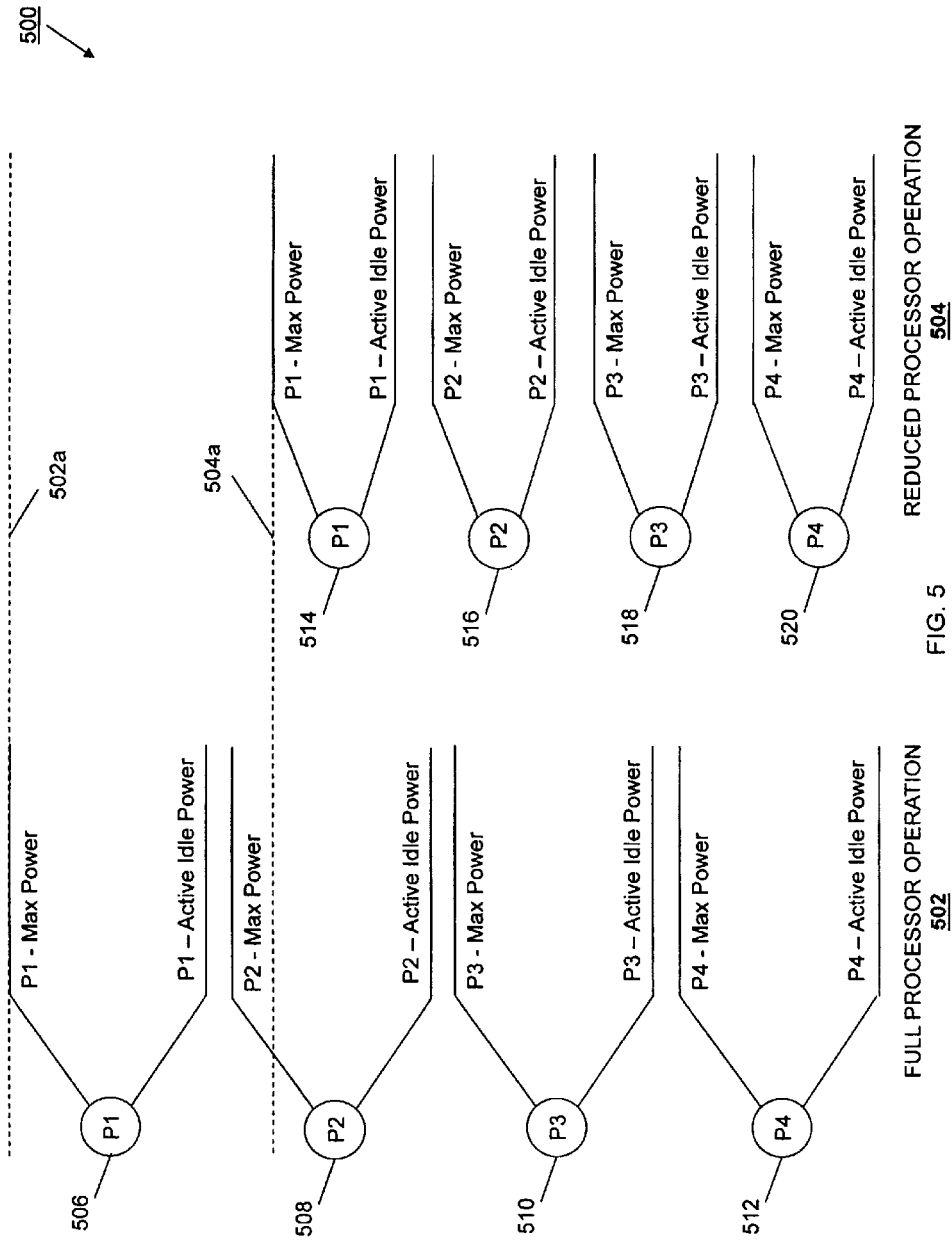
FIG. 5 is a graphical view illustrating an embodiment of processor operation according to a first maximum load current and a second maximum load current.

Changing the maximum load current for the processor system 206 reduces the performance of the processor 206*a*. FIG. 5 illustrates a processor operation graph 500 that includes full processor operation 502 with a full maximum load current 502*a*, and reduced processor operation 504 with a reduced maximum load current 504*a*. As can be seen, at full processor operation 502 according to the full maximum load current 502*a*, the processor 206*a* in the processor system 206 will include a first performance state 506 with maximum power and active idle power that each lie between the full maximum load current 502*a* and the reduced maximum load current 504*a*, a second performance state 508 with maximum power that extends above the reduced maximum load current 504*b* and an active idle power below the reduced maximum load current 504*a*, a third performance state 510 with maximum power and active idle power that each lie below the reduced maximum load current 504*a*, and a fourth performance state 512 with maximum power and active idle power that each lie below the reduced maximum load current 504*a*. As can also be seen, at reduced processor operation 504 according to the reduced maximum load current 504*a*, the processor 206*a* in the processor system 206 will include a first performance state 514 with maximum power and active idle power that each lie below the reduced maximum load current 504*a*, a second performance state 516 with maximum power and active idle power that each lie below the reduced maximum load current 504*a*, a third performance state 518 with maximum power and active idle power that each lie below the reduced maximum load current 504*a*, and a fourth performance state 520 with maximum power and active idle power that each lie below the reduced maximum load current 504*a*. Thus, the reduced maximum load current 504*a* for the processor system 206 may compress the operating states of the processor 206*a* in order to ensure that the processor system 206 does not draw current above the reduced maximum load current. One of skill in the art will recognize that the processor may include a variety of other performance and/or operating states, which have been omitted for clarity of discussion. Furthermore, the limiting or removal of the max performance state and/or other power states may be performed by the system to reduce peak power.

Such a reduction in performance of the processor 206*a* may raise issues if the processor performance is reduced such that the system does not operate as desired, and thus a processor performance "floor" may be defined. FIG. 4 illustrates a processor performance floor 426 that is illustrated relative to the power demand 424 for the processor system 206. In one example, a processor may be rated from 1.2-3.2 Ghz, but it may be determined that that processor will not function as desired below 2.9 Ghz, and thus the processor performance floor may be set at 2.9 Ghz.

Following the determination of the second power system budget at block 314 of the method 300, the method 300 proceeds to decision block 316 where it is determined whether a modified system performance resulting from the modified system configuration is above a minimum level. In an embodiment, the power system controller 204 determines whether the recalculated maximum load current for the processor system 206 that was used to determine the second system power budget 422 allows the processor 206*a* to operate above the processor performance floor 426. For example, the processor performance floor 426 may include a predetermined maximum load current below which the processor 206*a* will not operate at a desired level, and if the power system controller 204 determines that the recalculated maximum load current for the processor system 206 that was used to determine the second system power budget is below that predetermined maximum load current, as illustrated in FIG. 4, the method 300 then proceeds to block 320 where the system is powered using the second system power budget. In an embodiment, the power system controller 204 may reprogram the configuration register with the recalculated maximum load current for the processor system 206 that was used to determine the second system power budget in order to have the power system 202 power the system using the second system power budget.

In one example, the following includes simplified pseudo-code that could be used to provide a variable maximum load current ("CURRENT_LIMIT") for the system:

```
If (CPU_ICCMAX < CPU_VR_ICCMAX)
    {CURRENT_LIMIT = CPU_ICCMAX; }
    Else {CURRENT_LIMIT = CPU_VR_ICCMAX;}
        If (Power_Budget > PSU_EPR)
            {Current_Limit_Reduction = ((Power_Budget −
                PSU_EPR)/CPU_qty)/CPU_volt
            If (Current_Limit_Reduction < ICCMAX_FLOOR)
            {Current_Limit_Reduction = ICCMAX_FLOOR}
            CURRENT_LIMIT = CURRENT_LIMIT −
            Current_Limit_Reduction}
            Power_Budget = Power_Budget −
            (Current_Limit_Reduction * CPU_volt * CPU_ qty)
```

If, at decision block 316, the power system controller 204 determines that the modified system performance resulting from the modified system configuration is below the minimum level, the method 300 then proceeds to block 318 where a sub-minimum processor performance action is taken. In an embodiment, the sub-minimum processor performance action may include preventing the system from starting up, providing a warning for display to a user (e.g., "your power system is currently not capable of sufficiently powering your processor(s) above a minimum level), requesting a user action (e.g., "please upgrade your power system or downgrade your processor"), and/or a variety of other actions known in the art. In some embodiments, following block 318, the power system controller may provide power from the power system 202 to the powered components system(s) even with the processor system 202 operating below the minimum level.

Thus, a system and method have been described that intelligently adjust system configuration details based on an output capability of a power system to ensure that peak power excursions by the system components will not cause the power system to operate outside a defined range. The systems and methods of the present disclosure allow an IHS manufacturer to use a given power system with more IHSs than conventionally allowed, as a variety of IHSs may be configured to fit the power system. The systems and methods also allow the use of smaller and more efficient power systems with more IHSs than previously was possible, saving costs and energy. As discussed above, the system may be implemented as static configuration system that configures the system upon startup and prior to runtime. However, some processor systems may support the updating of the maximum load current during runtime based on detected power levels. With such updating supported, the power system controller may monitor system components with relatively slow moving power demands (e.g., fans, storage, etc.) to determine if they reach a predetermined level, and that predetermined level may be chosen based on an enhanced possibility, that with the power demand from those system components, the power system may enter an undefined operating range in combination with peak power processor features (e.g., "Turbo Boost").

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power output limit-based configuration system, comprising:
   a power system;
   a plurality of powered component systems coupled to the power system, wherein at least one of the plurality of powered component systems includes a first powered component configuration; and
   a power system controller coupled to the power system and the plurality of powered component systems, wherein the power system controller is configured to:
   retrieve a power output limit of the power system;
   determine a first system power budget for the plurality of powered component systems using the first powered component configuration of the at least one of the plurality of powered component systems;
   determine that the first system power budget exceeds the power output limit and, in response:
      determine a second powered component configuration for the at least one of the plurality of powered component systems that reduces the operating power consumption of the at least one of the plurality of powered component systems and creates a second system power budget for the plurality of powered component systems that does not exceed the power output limit;
      reconfigure the at least one of the plurality of powered component systems from the first powered component configuration to the second powered component configuration; and
      provide power from the power system to the plurality of powered component systems according to the second system power budget such that the at least one of the plurality of powered component systems operate using the second powered component configuration.

2. The power output limit-based configuration system of claim 1, wherein the first powered component configuration and the second powered component configuration include maximum load currents for a processor.

3. The power output limit-based configuration system of claim 1, wherein the at least one of the plurality of powered component systems that is reconfigured to the second powered component configuration includes a powered component and a powered component voltage regulator.

4. The power output limit-based configuration system of claim 1, wherein the power system controller is further configured, in response to determining that the first system power budget exceeds the power output limit, to:
   determine the second powered component configuration that creates the second system power budget for the plurality of powered component systems that does not exceed the power output limit; and
   determine whether the second powered component configuration causes the at least one of the plurality of powered component systems to operate below a minimum level, wherein the plurality of powered component systems are powered according to the second power budget in response to determining that the second powered component configuration does not cause the at least one of the plurality of powered component systems to operate below the minimum level.

5. The power output limit-based configuration system of claim 4, wherein a warning is provided in response to determining that the second powered component configuration causes the at least one of the plurality of powered component systems to operate below the minimum level.

6. The power output limit-based configuration system of claim 1, wherein the at least one of the plurality of powered component systems is reconfigured using the second powered component configuration by programming a configuration register in the at least one of the plurality of powered component systems with the second powered component configuration.

7. The power output limit-based configuration system of claim 6, wherein the configuration register is located in a powered component voltage regulator in the at least one of the plurality of powered component systems.

8. An information handling system (IHS), comprising:
   a plurality of IHS components including a processor system having a first maximum load current; and
   a power system controller coupled to the plurality of IHS components and configured to couple to a power supply, wherein the power system controller is configured to:
   retrieve a power output limit of the power supply;
   determine a first system power budget for the plurality of IHS components using the first maximum load current of the processor system;
   determine that the first system power budget exceeds the power output limit and, in response:

determine a second maximum load current for the processor system that reduces the operating power consumption of the processor system and creates a second system power budget for the plurality of IHS components that does not exceed the power output limit;

reconfigure the processor system from the first maximum load current to the second maximum load current; and provide power from the power supply to the plurality of IHS components according to the second system power budget such that the processor system operates using the second maximum load current.

9. The IHS of claim 8, wherein the processor system includes a processor and a processor voltage regulator.

10. The IHS of claim 8, wherein the power system controller is further configured, in response to determining that the first system power budget exceeds the power output limit, to:

determine the second maximum load current that creates the second system power budget for the plurality of IHS components that does not exceed the power output limit; and determine whether the second maximum load current causes the processor system to operate below a minimum level, wherein the plurality IHS components are powered according to the second power budget in response to determining that the second maximum load current does not cause the processor system to operate below the minimum level.

11. The IHS of claim 10, wherein a warning is provided in response to determining that the second maximum load current causes the processor system to operate below the minimum level.

12. The IHS of claim 8, wherein the processor system is reconfigured using the second maximum load current by programming a configuration register in the processor system with the second maximum load current.

13. The IHS of claim 12, wherein the configuration register is located in a processor voltage regulator in the processor system.

14. A method for configuring an information handling system IHS for a power system output capability, comprising:

retrieving a power output limit of a power system;

determining a first system power budget for a plurality of powered component systems using a first powered component configuration of a first powered component system of the plurality of powered component systems;

determining that the first system power budget exceeds the power output limit and, in response:

determining a second powered component configuration for the first powered component system that reduces the operating power consumption of the first powered component system and creates a second system power budget for the plurality of powered component systems that does not exceed the power output limit;

reconfiguring the first powered component system from the first powered component configuration to the second powered component configuration; and providing power from the power system to the plurality of powered component systems according to the second system power budget such that the first powered component system operates using the second powered component configuration.

15. The method of claim 14, wherein the first powered component configuration and the second powered component configuration include maximum load currents for the first powered component system.

16. The method of claim 14, wherein the first powered component system that is reconfigured to the second powered component configuration includes a powered component and a powered component voltage regulator.

17. The method of claim 14, further comprising:

determining the second powered component configuration that creates the second system power budget for the plurality of powered component systems that does not exceed the power output limit; and determining whether the second powered component configuration causes the first powered component system to operate below a minimum level, wherein the plurality of powered component systems are powered according to the second power budget in response to determining that the second powered component configuration does not cause the first powered component system to operate below the minimum level.

18. The method of claim 17, wherein a warning is provided in response to determining that the second powered component configuration causes the first powered component system to operate below the minimum level.

19. The method of claim 14, wherein the first powered component system is reconfigured using the second powered component configuration by programming a configuration register in the first powered component system with the second powered component configuration.

20. The method of claim 19, wherein the configuration register is located in a powered component voltage regulator in the first powered component system.

* * * * *